(12) United States Patent
Guinart

(10) Patent No.: US 6,687,897 B2
(45) Date of Patent: Feb. 3, 2004

(54) XML BASED SCRIPT AUTOMATION

(75) Inventor: Olivier Guinart, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 339 days.

(21) Appl. No.: 09/727,598

(22) Filed: Dec. 1, 2000

(65) Prior Publication Data

US 2002/0091999 A1 Jul. 11, 2002

(51) Int. Cl.[7] .............................. G06F 9/45; G06F 9/44
(52) U.S. Cl. ........................................ 717/143; 717/115
(58) Field of Search ........................ 717/139, 140–143, 717/114–119; 707/103, 104.1

(56) References Cited

U.S. PATENT DOCUMENTS

| | | | | |
|---|---|---|---|---|
| 6,243,862 B1 | * | 6/2001 | Lebow ........................ | 717/131 |
| 6,311,320 B1 | * | 10/2001 | Jibbe .......................... | 717/111 |
| 6,337,696 B1 | * | 1/2002 | Lindhorst et al. ........... | 345/763 |
| 6,453,329 B1 | * | 9/2002 | Dodgen ....................... | 715/516 |
| 6,470,349 B1 | * | 10/2002 | Heninger et al. ........... | 707/102 |
| 6,473,893 B1 | * | 10/2002 | Kay et al. ................... | 717/116 |

OTHER PUBLICATIONS

Bramley et al. A Component Based Services Architectures for Building Distributed Applications. IEEE. 2000. pp. 51–59.*

Chiu. A Script Languages for Generating Internet–bots. IEEE. 2001. pp. 667–671.*

Theneyan et al. XML–Based Visual Specifications of Multidisciplinary Applications. IEEE. 2001. pp. 414–421.*

Steven Ball, *XML Support For Tcl*, 6th Annual Tcl.Tk conference, USENIX Association, Sep. 14–18, 1998, pp. 109–119.

Anders Tornqvist et al, *XML and Objects—The Future of e–Forms on the Web*, IEEE, Sep. 1999, pp 303–308.

* cited by examiner

*Primary Examiner*—Wei Zhen
(74) *Attorney, Agent, or Firm*—Workman, Nydegger

(57) ABSTRACT

Systems, methods and data structures for encompassing scripts written in one or more scripting languages in a single file. The scripts of a computer system are organized into a single file using Extensible Language Markup (XML). Each script is delimited by a file element and the script's instructions are delimited by a code element within each file element. Other information, such as a name of the script and a functional description of the script may also be included in the file using other XML elements to delimit that information. The language in which a particular script is written is also included within the XML format. When a particular script is executed, the file is parsed to create a list of the script names or of the functional descriptions of the scripts. One or more scripts are selected and the code for those scripts is extracted from the file and executed by the appropriate scripting process. The scripting process that executes a particular script is identified from the scripting extension attribute that is included in the XML format of the file.

27 Claims, 3 Drawing Sheets

XML BASED SCRIPT AUTOMATION

BACKGROUND OF THE INVENTION

1. The Field of the Invention

The present invention relates to computer languages. More particularly, the present invention relates to scripting languages and specifically to the management of scripts using Extensible Markup Language (XML) to format the scripts into a single file regardless of the scripting language used for each individual script.

2. The Prior State of the Art

People are becoming increasingly dependent on computers as they are used in many aspects of their lives including at home, at work, and at school. Because computers are so pervasive in our society, more and more tasks that were previously performed manually are becoming automated. Word processing programs are able to correct spelling and grammar on the fly as well as provide tools such as a dictionary and a thesaurus. Financial applications now allow us to access our accounts over the Internet and even make payments that are automatically deducted from our accounts. Other applications have been created to meet various consumer needs.

These applications are created through the use of programming languages, which are essentially a set of rules that instruct a computer to perform specific tasks. Programming languages such as Basic, C, C++, Pascal, and the like each have a special syntax that is used to formulate various instructions. A high level programming language is more like a human language and is more easily understood by the programmer when compared with machine language, which is strictly numerical in nature. The high level programming language has to be converted or compiled into machine language before it can be executed by a computer. In other words, high level programming languages serve as an intermediary between the programmer and the computer because the computer only understands machine language, but programmers have difficulty working with machine language.

While high level languages are easier for programmers to understand than machine language, they are not simple and inexperienced end users cannot easily write small applications to perform simple tasks. A solution to this problem is found in scripting languages, which are much simpler to learn and implement and are typically lightweight versions of high level programming languages.

Understandably, scripting languages, such as CGI, Perl, JavaScript, VBScript and the like, are relatively popular and are frequently used to automate a wide variety of tasks. Macros, for example, are scripts that automate tasks in some computer applications such as word processors and spreadsheet applications. Batch files are another example of scripts. In many local area networks, scripts are used when a user logs on to the network. Scripts are also used in the Internet. For instance, when a user performs a search, the search query is often passed to the search engine by a script and the results of the search are returned to the user using another script. In sum, scripts are used in many different situations and have a wide range of applications.

Each script file is specific to a particular language and the syntax of one script language cannot currently be mixed with the syntax of another script language. If different scripting languages are used in a single script, an error will result. Often, the language in which a script is written can be identified from the file extension. For example, a ".vbs" extension indicates that the script was written in VBScript. Because each scripting language typically has certain advantages and disadvantages when compared to other scripting languages, the scripts existing on a particular computer are often written in different languages. Often, a user may choose to write scripts in different languages to take advantage of the strengths of various scripting languages.

The number of scripts on a particular computer or computer system can be relatively high. Because the scripts are usually written for specific purposes, the scripts can be located across the file system of the computer and may be difficult to locate. In addition to these characteristics, scripts are usually executed from the command line. As a result, the names of the scripts are short and are not very descriptive of the scripts. Short non descriptive names can make it difficult to determine or ascertain the function of a particular script from the name of the script. This problem is compounded by the high number of scripts from which the user must often choose. When a user needs to execute a particular script, the user is faced with the tasks of determining which script file is the correct script file and locating the script file on the computer or computer system.

SUMMARY OF THE INVENTION

Scripting is used to automate a wide variety of tasks in computers and computer networks or systems and is a core component of many applications. Scripts are often used for large deployments, policies, silent processes, automated processes, and the like. Instead of managing each script as a separate file, the present invention allows all scripts to be encompassed in a single file regardless of the scripting languages used to create the scripts. Consolidating the scripts of a computer or of a computer system into a single file simplifies the task of managing the scripts and facilitates the identification and execution of a particular script. A user is also relieved of locating a particular script.

The present invention incorporates the scripts of a computer system into a single file using Extensible Markup Language (XML) or another suitable format. Script commands or statements are encapsulated within XML elements, which allows scripts written in different scripting languages to be included in the same file. The XML elements are also used to delimit and separate each individual script. Because XML is not associated with any particular scripting language and because the scripts are delimited by the XML elements, other information about the scripts may be included in the single file. For example, the language in which the script is written can be conveyed with the XML format. Another advantage of using XML to define the scripts is that more descriptive names and detailed functional descriptions can be provided for each script within the XML format of the file.

When a script is to be executed, the file containing the scripts is parsed. In one example, the names of each script are determined by the parser and presented to the user in a list. Alternatively, the user can be presented with the detailed description of each script and the user can select the appropriate script for execution from this list. Because the names parsed from the file are descriptive, a user can more easily select the appropriate script from the presented list. Once a script is selected, the selected script is executed by the appropriate scripting process. More specifically, the script statements or instructions of the selected script are parsed from the file and executed using the appropriate scripting process associated with the language in which the script is written.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1:
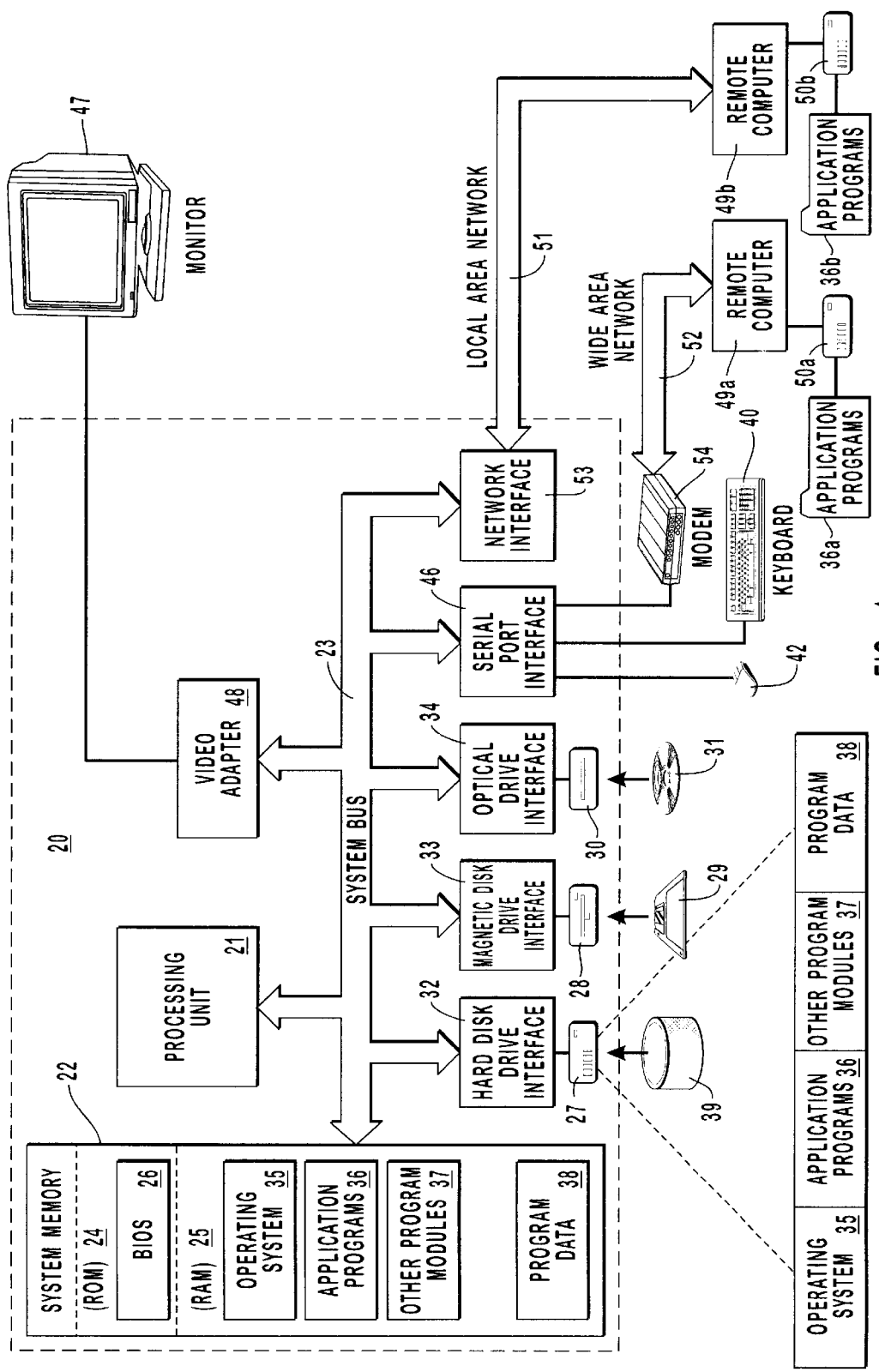
FIG. 1 illustrates an exemplary system that provides a suitable operating environment for the present invention.

The present invention provides for encompassing one or more scripts into a single file. The present invention uses Extensible Markup Language (XML) to define or format scripts within the single file. Because XML is often used to convey data, the language in which each script is written does not have an impact on other scripts included in the file. However, the scripting language of each script may be identified within the XML format. Advantageously, the XML format allows other information about each script to be included in the file.

When it is necessary to execute a particular script, the file is parsed to separate identifiers that are presented to a user in a list. The identifiers can include the name of each script, a detailed description of each script, or the like or any combination thereof. When a script is selected from the list, that script's statements, instructions or code are parsed from the file and executed by the appropriate scripting process. Alternatively, each script's codes or statements can be parsed and separated before a particular script is identified.

While the schema or format of the file used to encompass the scripts of a computer system is described herein in terms of XML, it is understood that other file schemas or formats, such as HyperText Markup Language (HTML), Standard Generalized Markup Language (SGML) or the like or any combination thereof may be used as described herein.

The present invention extends to both methods, systems, and data structures for encompassing scripts in a single file and for identifying and executing scripts. The embodiments of the present invention may comprise a special purpose or general purpose computer including various computer hardware, as discussed in greater detail below.

Embodiments within the scope of the present invention also include computer-readable media for carrying or having computer-executable instructions or data structures stored thereon. Such computer-readable media can be any available media which can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general purpose computing device in the form of a conventional computer 20, including a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help transfer information between elements within the computer 20, such as during start-up, may be stored in ROM 24.

The computer 20 may also include a magnetic hard disk drive 27 for reading from and writing to a magnetic hard disk 39, a magnetic disk drive 28 for reading from or writing to a removable magnetic disk 29, and an optical disk drive 30 for reading from or writing to removable optical disk 31 such as a CD-ROM or other optical media. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer-executable instructions, data structures, program modules and other data for the computer 20. Although the exemplary environment described herein employs a magnetic hard disk 39, a removable magnetic disk 29 and a removable optical disk 31, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 39, magnetic disk 29, optical disk 31, ROM 24 or RAM 25, including an operating system 35, one or more application programs 36, other program modules 37, and program data 38. A user may enter commands and information into the computer 20 through keyboard 40, pointing device 42, or other input devices (not shown), such as a microphone, joy stick, game pad, satellite dish, scanner, or the like. These and other input devices are often connected to the processing unit 21 through a serial port interface 46 coupled to system bus 23. Alternatively, the input devices may be connected by other interfaces, such as a parallel port, a game port or a universal serial bus (USB). A monitor 47 or another display device is also connected to system bus 23 via an interface, such as video adapter 48. In addition to the monitor, personal computers typically include other peripheral output devices (not shown), such as speakers and printers.

The computer 20 may operate in a networked environment using logical connections to one or more remote computers, such as remote computers 49a and 49b. Remote computers 49a and 49b may each be another personal computer, a server, a router, a network PC, a peer device or other common network node, and typically include many or all of the elements described above relative to the computer 20, although only memory storage devices 50a and 50b and their associated application programs 36a and 36b have been illustrated in FIG. 1. The logical connections depicted in FIG. 1 include a local area network (LAN) 51 and a wide area network (WAN) 52 that are presented here by way of example and not limitation. Such networking environments are commonplace in office-wide or enterprise-wide computer networks, intranets and the Internet.

When used in a LAN networking environment, the computer 20 is connected to the local network 51 through a network interface or adapter 53. When used in a WAN networking environment, the computer 20 may include a modem 54, a wireless link, or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing communications over wide area network 52 may be used.

Figures 2, 3:
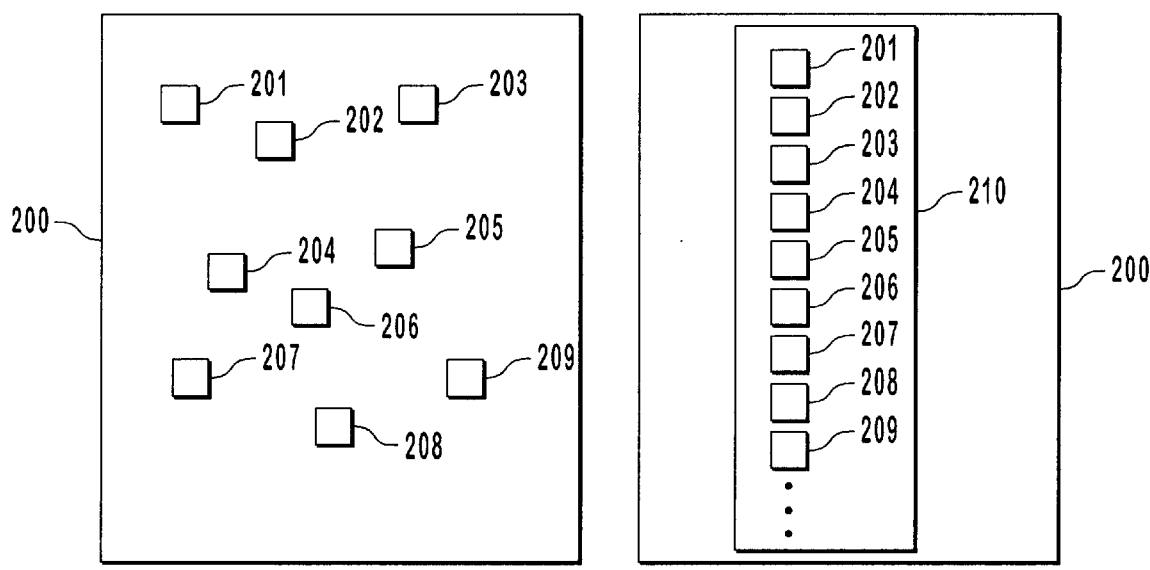
FIG. 2 is a block diagram illustrating various scripts that are location on a computer.
FIG. 3 illustrates how the scripts shown in FIG. 2 may be organized within a single file.

FIG. 2 is a block diagram that illustrates the organization of scripts on a typical computer or within a computer system or network. In this example, the computer 200 has scripts 201 through 209, but it is understood that the number of scripts existing on a computer or on a computer system can vary significantly and that some computers have hundreds of different scripts. The scripts 201–209 are often located in different directories or folders and usually have different names and the scripts 201–209 are not usually written in the same scripting language.

As a result of these conditions, the execution of a particular script may be difficult because the scripts typically have short, non-descriptive names, are difficult to locate, and the like. In accordance with the teachings of the present invention, FIG. 3 illustrates the computer 200 where the scripts 201–209 have been organized into a file 210. Encompassing all of the scripts 201–209 into a single file 210 relieves the user from having to remember the name of each individual script. In addition, the user is also relieved of the task of deciphering the function of each individual script from each script's short name. Instead, a more descriptive name as well as other information is included in the file 210 as described in more detail below. Also, all scripts on a particular machine or other computer system are organized in a single file instead of being scattered across the machine or other computer system.

Figure 4:
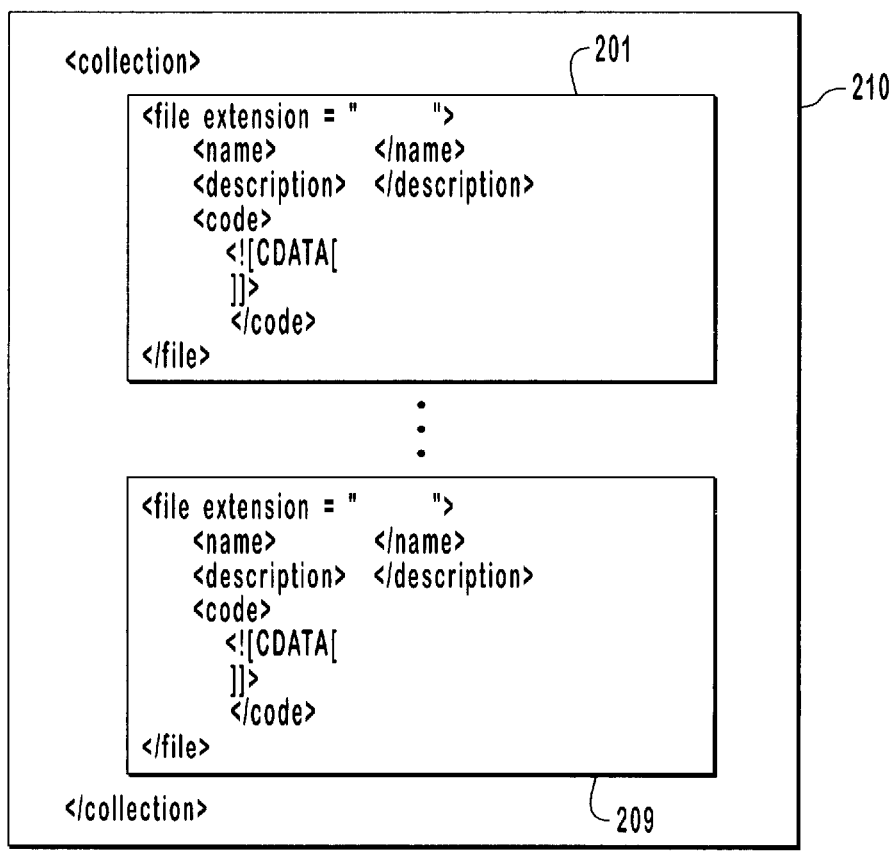
FIG. 4 is a detailed block diagram of a script file that illustrates a data structure for the script file.

The file 210 illustrated in FIG. 3 uses Extensible Markup Language (XML) to define each of the scripts 201–209 within the file 210. Thus, the file 210 is an XML file. While the present invention is described in terms of XML, it is understood that other schemas, formats and file types can be used as previously mentioned. Using XML to define the scripts 201–209 in a single file 210 has significant advantages in addition to those previously mentioned. XML is usable over the Internet and supports a wide variety of different applications. XML is easy to write and the file 210 can be easily edited to either remove or add scripts. Also, XML files are concise and relatively simple to create FIG. 4 illustrates a more detailed block diagram of the file 210 and illustrates a schema that allows the scripts of a computer or of a computer system to be incorporated or organized into an XML file 210. FIG. 4 is also used to illustrate a data structure of the present invention. As illustrated in FIG. 4, the script 201 has several XML elements that may be used to define the script 201. It is understood that those elements described herein are exemplary in nature and do not limit the elements that may be used to define scripts in an XML file.

All of the scripts 201–209 are encapsulated within a <collection> element that defines both the beginning and ending of the scripts as a whole. Each individual script within the file 210 is delimited using the <file> element. For example, the script 201 begins with a <file> start tag and is terminated with a </file> end tag. Within the <file> element, the "extension" attribute is used to indicate the language in which the script was written. For example, if the script 201 was written in JavaScript, then the extension attribute in the file element would read "<file extension="js">". In this manner the language of each individual script may be specified within the schema or format of the file 210.

Next, the script 201 has a <name> element that is used to provide a name for the script being defined. Because the name of the script 201 is defined in XML, the name can be more descriptive of the script and a user is less likely to cryptically name the script. In addition to providing a <name> element, a <description> element is also provided that allows the user to more fully describe the script 201. Often, the <description> element is used to provide a functional description of the script 201. As described in more detail with reference to FIG. 5, the <name> and <description> elements are particularly useful when a user desires to execute a particular script.

The script 201 also includes <code> elements followed by a <![CDATA[ element. The <![CDATA[> element contains the script statements or instructions to be executed. CDATA sections may occur anywhere character data may occur; they are used to escape blocks of text containing characters which would otherwise be recognized as markup. CDATA sections begin with the string "<![CDATA[" and end with the string "]]>". It also eases the script creation process or the existing migration of scripts in the XML file as well. Even though the script 201 is being written in an XML format, the instructions to be executed, which are delimited by the <code> element, are written in the appropriate scripting language defined by the extension attribute in the <file> element. In this example, each separate script is delimited using the <code> element.

Each of the other scripts encompassed within the file 210 is similarly defined within the file 210. In this manner, a user can incorporate any number of scripts within a single file regardless of the particular languages in which the various scripts are written. It is understood that attributes can be introduced with each XML element and that other aspects of XML may be incorporated.

Each XML element may be viewed as a data field that contains specific data. For example, the following data structure is an example of a file 210.

```
<?xml version="1.0"?>
<collection>
    <file extension="bat">
        <name>Directory and tree commands </name>
        <description> Directory command under the DOS
            prompt followed by the Tree command</
            description>
        <code><![CDATA[
            dir
            tree
        ]]></code>
    </file>
    <file extension="vbs">
        <name>Hello World !</name>
        <description>Inputs the user name and displays
            greetings</description>
        <code>
            <![CDATA[
            option explicit
            dim StrName
            '**** Get the Username
            StrName=InputBox("Please enter your name:",
                "Name")
            If StrName=" "Then StrName="World"
            End If
            MsgBox "Hello" & StrName,, "Hello !"
            ]]>
        </code>
    </file>
</collection>
```

This example includes two scripts within the file 210. The first script includes both the "dir" and the "tree" instructions that operate essentially to provide a directory of a folder or to list the files in a particular directory. The second script displays a message greeting the user by his/her name previously entered.

In this example of the file 210, the start tag for the <file> element of each script includes an extension attribute that identifies the scripting process that is to be applied to the script. In this specific example, the data structure is hierarchical and the <collection> element is the root of the file.

Figure 5:
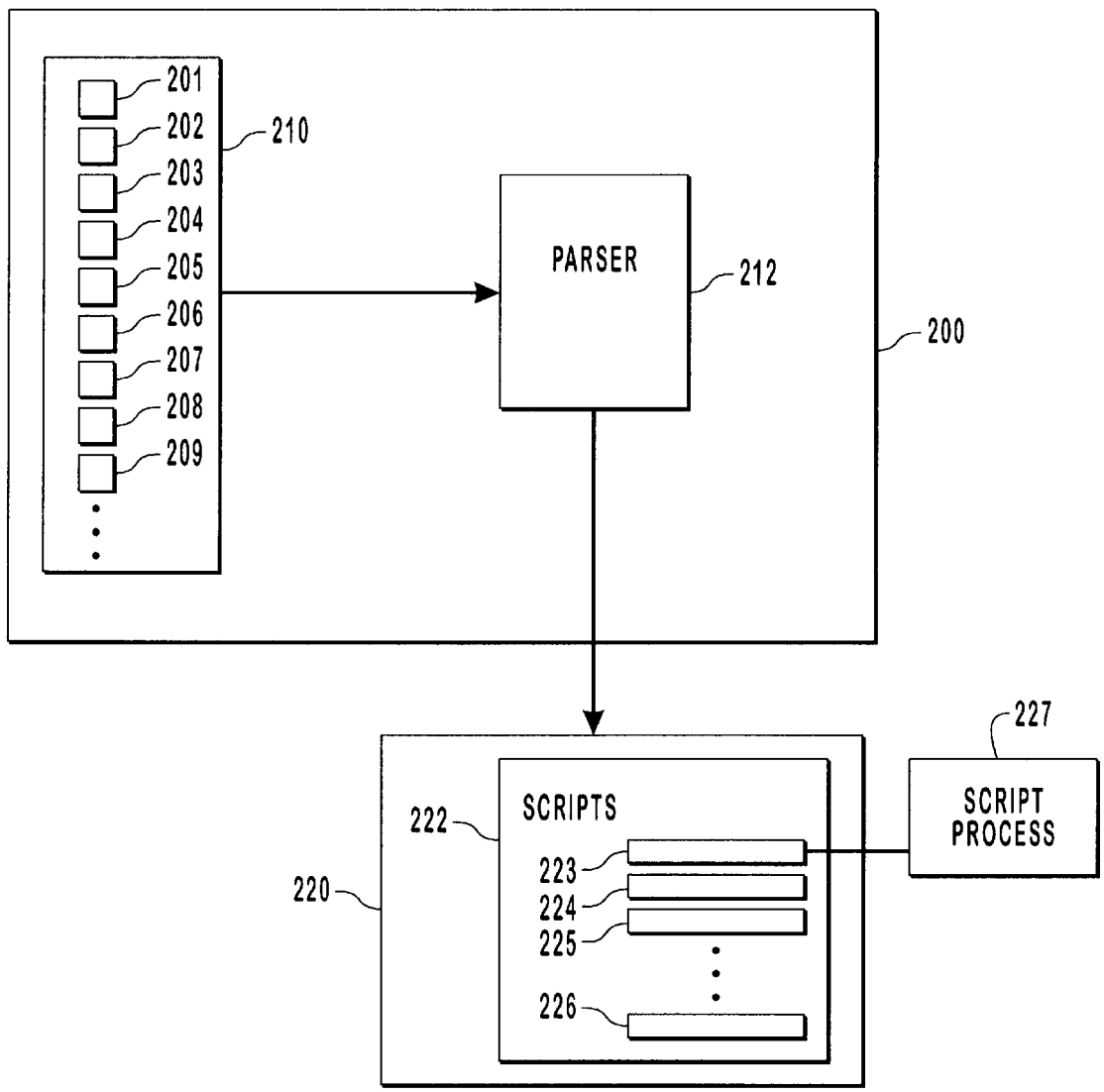
FIG. 5 is a block diagram illustrating how a particular script is selected and executed.

FIG. 5 is a block diagram illustrating how the scripts contained within the file 210 are executed by a user. Because the scripts 201–209 contained in the file 210 are defined by the XML elements, the parser 212 is able to identify each separate script. Thus, when a user desires to execute a script, the parser 212 is invoked, which parses the file 210 to generate a list 222 of the scripts that are included in the file 210. The list 222 is displayed to a user via a display device 220 and usually contains script identifiers as described in more detail below. The script statements or instructions can also be parsed such that they can be executed by the script process identified by the extension attribute.

Usually, parser 212 extracts the name of each script from the <name> element. Thus, identifier 223 may be the name of the script 201, identifier 224 may by the name of the script 202, and so forth. Alternatively, each identifier can correspond to a functional description of a script, which is parsed from the <description> element, or both the name and the description of each script can be displayed in the list 222. It is understood that the list 222 can display any of the information included in the file 210 and is not limited to the name and description of the scripts.

Once the list 222 is presented, the user may select one or more of the scripts for execution. Because the scripting process of each script may be determined from the extension attribute of the <file> elements, the appropriate script process 227 is called for the scripts identified and selected by a user. Once a script is selected, the script statements are parsed and saved in a temporary file that is compatible with the script process 227. In one example, more than one script can be selected and the selected scripts can be written in different scripting languages.

For example, if the selected script was written in VBScript, then the script statements may be saved to a temporary file with a ".vbs" extension. The temporary file is processed by the script process 227, which is a VBScript engine in this case. After the script is executed, the temporary file is deleted. Alternatively, the script statements can be parsed and directly provided to the script process 227 for execution, eliminating the need for a temporary file.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a computer system that includes one or more scripts that can be selected for execution by a user, a method for facilitating the identification and selection of the one or more scripts for execution, the method comprising the acts of:

incorporating the one or more scripts into a file, wherein the file is formatted in such a manner as to enable the one or more scripts to be associated with different scripting languages;

presenting a list of scripts to a user for selection, wherein the list includes an identifier for each of the one or more scripts, the identifier comprising a descriptive name and functional description of each corresponding script; and upon receiving a user selection of a particular identifier that is associated with a script from the list, executing the script that is associated with the particular identifier.

2. A method as defined in claim 1, wherein the act of encompassing the one or more scripts in a file further comprises the acts of:

including the descriptive name for each of the one or more scripts in the format of the file; and including the functional description for each of the one or more scripts in the format of the file.

3. A method as defined in claim 2, wherein the act of encompassing the one or more scripts in a file further comprises the act of using extensible markup language (XML) as the format to define each of the one or more scripts, wherein each of the one or more scripts is delimited by a file element and wherein the file has a collection element as a root.

4. A method as defined in claim 3, wherein the descriptive name is included within a name element, the functional description is included within a description element, a scripting process is identified in an extension attribute, and script instructions for each of the one or more scripts are delimited by a code element.

5. A method as defined in claim 2, wherein the act of parsing the file further comprises the acts of:

extracting the descriptive names for each of the one or more scripts.

6. A method as defined in claim 2, wherein the act of parsing the file further comprises the acts of:

extracting the functional description for each of the one or more scripts.

7. A method as defined in claim 1, wherein the act of selecting an identifier further comprises the act of presenting the list to the user using a user interface.

8. A method as defined in claim 1, wherein the act of executing the particular script further comprises the act of invoking a scripting process associated with the particular script, wherein the scripting process is identified in the file.

9. In a computer system that includes one or more scripts that can be selected for execution by a user, a method for facilitating the identification and selection of the one or more scripts for execution, the method comprising the acts of:

incorporating each of the one or more scripts in a file having a particular file format, wherein the particular file format allows the one or more scripts in the file to include different scripting languages;

specifying for each script that is incorporated within the file at least one script instruction, a corresponding descriptive name and a corresponding functional description;

upon receiving a user request for a script, parsing the file into a list that identifies each of the one or more scripts with an identifier comprising the descriptive name and functional description of each of the one or more scripts; and presenting the list to a user for selection of the one or more scripts.

10. A method as defined in claim 9, wherein the format is extensible markup language (XML).

11. A method as defined in claim 10, wherein the act of identifying the scripting language further comprises the act of including an extension attribute in the file element the extension attribute identifying the scripting language.

12. A method as defined in claim 10, wherein the act of including the script statements further comprises the act of delimiting the script instructions with a code element.

13. A method as defined in claim 12, wherein the code element encompasses a CDATA element, wherein data delimited by the CDATA element is not recognized as the format.

14. A method as defined in claim 10, further comprising the act of delimiting the descriptive name for each of the one or more scripts in a name element within each file element.

15. A method as defined in claim 14, further comprising the acts of:

parsing the file to separate the descriptive names of the one or more scripts;

presenting the descriptive names to a user in a list;

selecting one of the descriptive names to identify a particular script from the list; and parsing the file to separate the script instructions for the particular script; and executing the script instructions for the particular script using a scripting process associated with the scripting language of the particular script.

16. A method as defined in claim 14, further comprising the acts of:

parsing the file to separate the functional descriptions of the one or more scripts;

selecting one of the functional descriptions from the list to identify a particular script; and parsing the file to separate the script instructions for the particular script; and executing the script instructions for the particular script using a scripting process associated with the scripting language of the particular script.

17. A method as defined in claim 10, further comprising the act of delimiting the functional description for each of the one or more scripts in a description element within each file element.

18. A computer readable medium having computer executable instructions for performing the acts recited in claim 9.

19. In a computer system having one or more scripts written in one or more scripting languages, a computer readable having stored thereon a data structure for encompassing the one or more scripts into a single file, the data structure comprising:

a file element field for each of the one or more scripts, wherein each file element field delimits one of the one or more scripts;

an extension attribute field included in each file element field, wherein the extension attribute field identifies a scripting language;

a code element field included within each file element field, wherein the code element field contains script instructions in the scripting language identified in the extension attribute field;

a name element field within each file element field, wherein the name element field contains a descriptive name; and a description element field within each file element field, wherein the description element field contains a functional description.

wherein the data structure is configured to be parsed by a parser into a list for presentation to a user and that includes an identifier for each of the one or more scripts, the identifier comprising the descriptive name and functional description of each script.

20. A data structure as defined in claim 19, further comprising a CDATA element field within the code element field, wherein the CDATA element field precludes data within the CDATA element field from being recognized as a format of the data structure.

21. A data structure as defined in claim 19, wherein the file elements for the one or more scripts are delimited by a collection element, wherein the collection element is a root of the file.

22. In a computer system having one or more scripts written in one or more scripting languages, a data structure for organizing the one or more scripts into a file, the data structure comprising:
   a plurality of file data fields, wherein each data field contains one of the one or more scripts and wherein each file data field includes an extension attribute identifying a scripting language for each of the one or more scripts; and
   within each file data field;
      a name data field containing a descriptive name of the script contained in the file data field;
      a description data field containing a functional description of the script contained in the file data field; and
      a code data field containing script statements written in the scripting language identified by the extension attribute of the file data field,
   wherein the data structure is configured to be parsed by a parser into a list for presentation to a user and that includes an identifier for each of the one more scripts, the identifier comprising the descriptive name and functional description of each script.

23. A data structure as defined in claim 22, wherein the file data field further comprises a CDATA data field.

24. A data structure as defined in claim 23, wherein the CDATA data field is an XML element.

25. A data structure as defined in claim 22, wherein the file data field is an XML element.

26. A data structure as defined in claim 22, wherein the name data field is an XML element, the description data field is an XML element, and the code data field is an XML element.

27. A data structure as defined in claim 22, wherein the plurality of file data fields are delimited by a collection element.

* * * * *